United States Patent
Diggs

[15] 3,656,599
[45] Apr. 18, 1972

[54] CENTRIFUGAL CLUTCH

[72] Inventor: Thomas M. Diggs, 1349 Otis Street, N.E., Washington, D.C. 20017

[22] Filed: Aug. 11, 1970

[21] Appl. No.: 62,908

[52] U.S. Cl..........................192/42, 192/48.92, 192/105 BA
[51] Int. Cl........................................................F16d 13/04
[58] Field of Search.................192/48.92, 42, 48.3, 105 BA, 192/105 CP, 48.6

[56] References Cited

UNITED STATES PATENTS

| | | | |
|---|---|---|---|
| 1,219,698 | 9/1913 | Brackett | 192/42 |
| 3,481,436 | 12/1969 | Wilkowski | 192/48.3 |
| 2,663,397 | 12/1953 | Scott | 192/42 |
| 2,452,111 | 10/1948 | Eaton | 192/105 BA |

Primary Examiner—Benjamin W. Wyche
Assistant Examiner—Randall Heald
Attorney—Victor J. Evans & Co.

[57] ABSTRACT

A centrifugal clutch mechanism operating with the drive shaft or flywheel of a small motor of a hobby vehicle (boat, car, etc.) or power tool and on the driven shaft of the same types of equipment for the purposes of torque transmission control with adjustability. It includes two centrifugally operated weights, counterpoised against springs, which press against a clutch drum with increasing force as the rotational speed increases. At low speeds the springs maintain the weights out of engagement with the drum. As the speed increases the weights come in contact with the clutch drum to drive the drum. In order to start the engine by hand or otherwise turning the driven shaft a pair of low speed automatically releasing pawls are provided for engagement with an annular ratchet.

In one form of the invention the clutch is attached to the flywheel or drive shaft of the mechanism and in another form it is attached to the driven shaft.

4 Claims, 7 Drawing Figures

INVENTOR.
THOMAS M. DIGGS

BY Victor J. Evans & Co.

ATTORNEY.

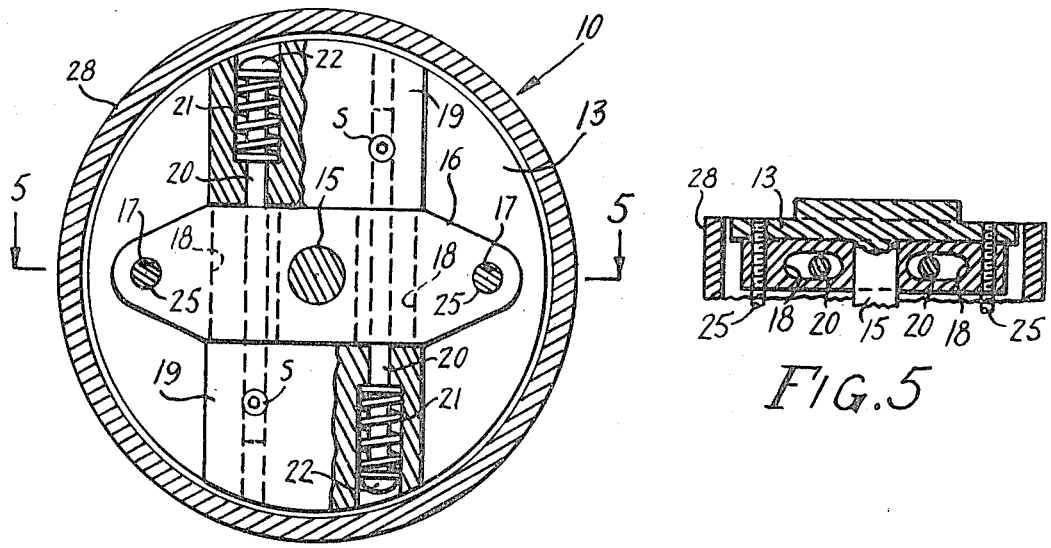
FIG.3
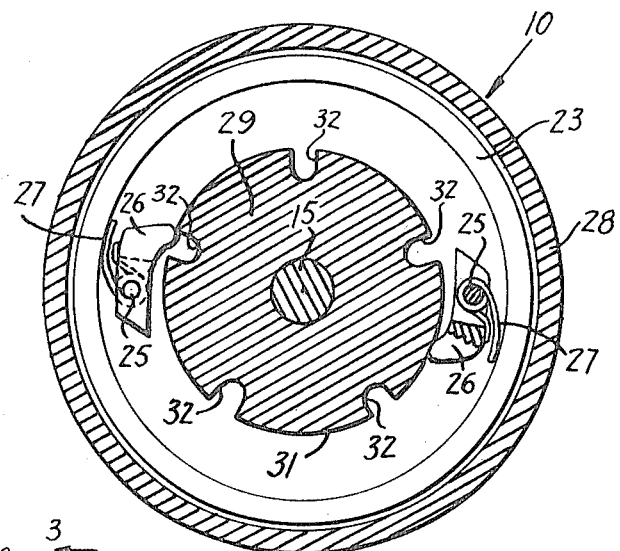
FIG.5
FIG.4
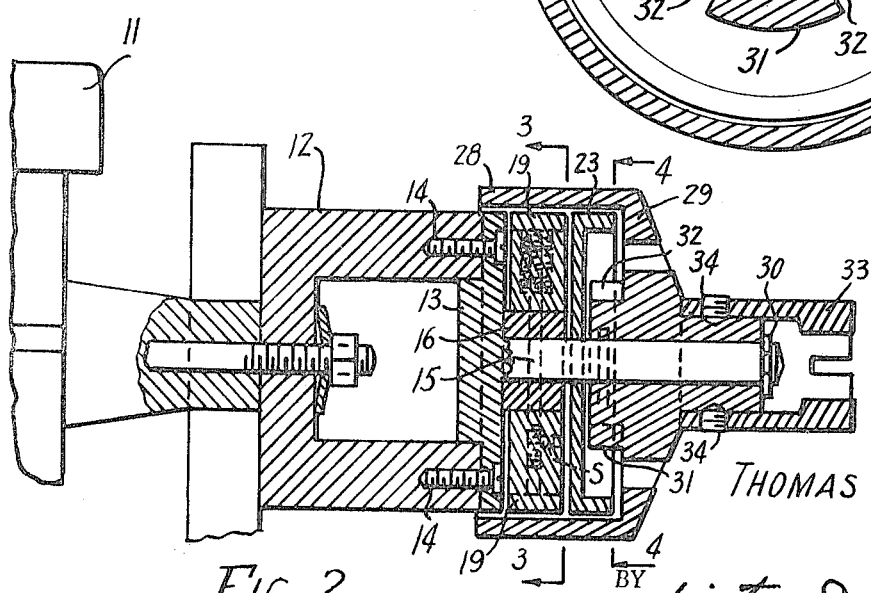
FIG.2
INVENTOR.
THOMAS M. DIGGS
BY Victor J. Evans & Co.
ATTORNEY.

CENTRIFUGAL CLUTCH

BACKGROUND OF THE INVENTION

1. Field of the Invention

The present invention relates to automatic centrifugal clutches used with hobby equipment and power tools.

2. Summary of the Invention

A centrifugal clutch mechanism in which a pair of rotary members are detachably connected by centrifugally operated weights mounted in the clutch on one rotary member for engagement with a clutch drum on other member so that the faster the clutch turns the greater force is utilized in the engagement of the weights with the clutch drum so that finally the rotary members turn at the same speed. Low speed starting torque between the rotary members is provided by an annular ratchet and a pair of spring pressed pawls.

The primary object of the invention is to provide a relatively simple centrifugal clutch which can be adjusted to vary the clutching action under varying centrifugal loads.

Other objects and advantages will become apparent in the following specification when considered in the light of the attached drawings.

BRIEF DESCRIPTION OF THE DRAWINGS

FIG. 2 is an enlarged fragmentary vertical sectional view taken through the clutch illustrated in FIG. 1;

FIG. 3 is a vertical cross-section taken along the line 3—3 of FIG. 2, looking in the direction of the arrows;

FIG. 4 is a vertical sectional view taken along the line 4—4 of FIG. 2, looking in the direction of the arrows;

FIG. 5 is a reduced fragmentary horizontal section view taken on the line 5—5 of FIG. 3, looking in the direction of the arrows;

DESCRIPTION OF THE PREFERRED EMBODIMENTS

Figure 1:
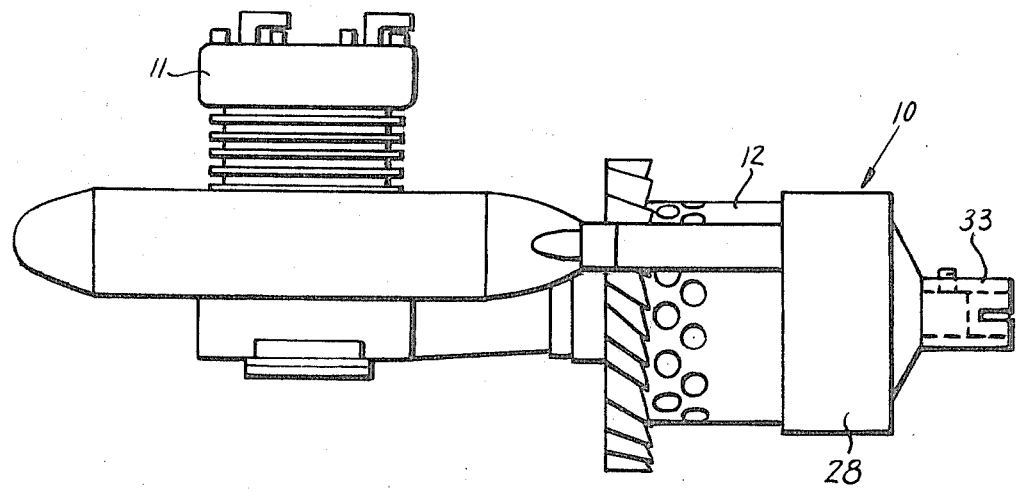
FIG. 1 is a side elevation of the invention.

Referring now to the drawings in detail wherein like reference characters indicate like parts throughout the several figures the reference numeral 10 indicates generally a centrifugal clutch mechanism constructed in accordance with the invention.

The centrifugal clutch 10 is adapted for use with the engine 11 of a hobby vehicle or power tool of the type which includes a generally cylindrical flywheel 12. The centrifugal clutch 10 is adapted to be connected to the flywheel 12 and includes a generally circular face plate 13 secured by cap screws 14 to the flywheel 12 in axial alignment therewith. An axial shaft 15 is integrally formed with the face plate 13 and extends outwardly therefrom oppositely of the flywheel 12.

A spacer block 16 is engaged against the face plate 13 and the shaft 15 extends centrally therethrough. The spacer plate 16 has bolt holes 17 extending parallel to the shaft 15 adjacent the outer ends of the spacer 16. A pair of spaced, ovate, parallel, transverse, bores 18 extend through the spacer 16 substantially perpendicular to the axis of the shaft 15 and spaced outwardly therefrom. A pair of weights 19 are arranged in oppositely disposed relation on opposite sides of the spacer 16 and are mounted on a pair of spaced parallel bolts 20 which extend loosely through the bores 18. A coil spring 21 is mounted in the weights 19 around each of the bolts 20 engaging against the head 22 of the bolt 20. The action of the coil spring 21 is to normally urge the weight 19 inwardly toward the spacer 16. The threaded end of the bolt 20 opposite the head 22 is threaded into the opposite weight 19, and is secured therein by a set-screw S. The bolt 20 is adjustable in the weight 19 in which it is threaded to vary the tension on the spring 21 and thus the grip of the weight 19 with the clutch drum 28 at any given R.P.M..

A generally cylindrical pawl plate 23 is mounted on the shaft 15 and is secured to the spacer 16 and the face plate 13 by a pair of bolts 25 extending parallel to the shaft 15 through the bores 17, the face plate 13 and into the flywheel 12. The heads of the bolts 25 serve as pawl pivot pins as described below. A pawl 26 is pivotally mounted on each of the bolts 25 and a coil spring 27 is wrapped around the bolt 25 engaging the pawls 26 and the pawl plate 23 to normally urge the pawls inwardly with respect to the shaft 15.

The pawls 26 may be reversed on the bolts 25 to provide a reverse drive when desired by simply removing the pawl and spring and turning them over and replacing on the bolt 25.

A generally cylindrical clutch drum 28 surrounds the face plate 13 and pawl plate 23 in axial alignment with the shaft 15. A hub 29 is integrally formed with the drum 28 and is journalled on the shaft 15 to which it is secured by a spring washer 30. The hub 29 has a central cylindrical portion 31 which extends toward the pawl plate 23 into a position to be engaged by the pawls 26. A plurality of pawl notches 32 are formed in the outer surface of the cylindrical portion 31 to be engaged by the pawls 26. A universal joint member 33 is secured to the hub 29 by set-screws 34.

In the use and operation of the invention the engine 11 is started by slow rotation of the clutch drum 28 by hand or other means. The pawls 26 engage in the notches 32 and drive the face plate 13 and thus the flywheel 12 and engine 11. After the engine 11 starts it then drives the flywheel 12 and drives in turn the face plate 13, shaft 15, spacer 16, and weights 19. The pawl plate 23 is also fixed to the face plate 13 and is driven thereby. As the speed of the flywheel 12 increases the weights 19 move outwardly into engagement with the clutch drum 28 to apply a driving force thereto. As the speed of the flywheel 12 continues to increase the weights 19 finally lock against the clutch drum 28 so that the clutch drum 28 is driven at the same speed as the flywheel 12. The pawls 26 disengage from the notches 32 under centrifugal force as the engine 11 turns the pawl plate 23.

Under maximum conditions of torque differential between the driving and driven shafts at high R.P.M.'s the spacer block 16 and weights 19 turn with respect to each other so that the end portions of the spacer blocks 16 press outwardly on the inner sides of the weights 19, to assist pressing the weights 19 into locking engagement with the clutch drum 28.

The clutch drum 28 and the weights 19 may be made of steel, aluminum, or any other material or combinations of materials desired to produce the range of clutching action desired.

Figure 6:
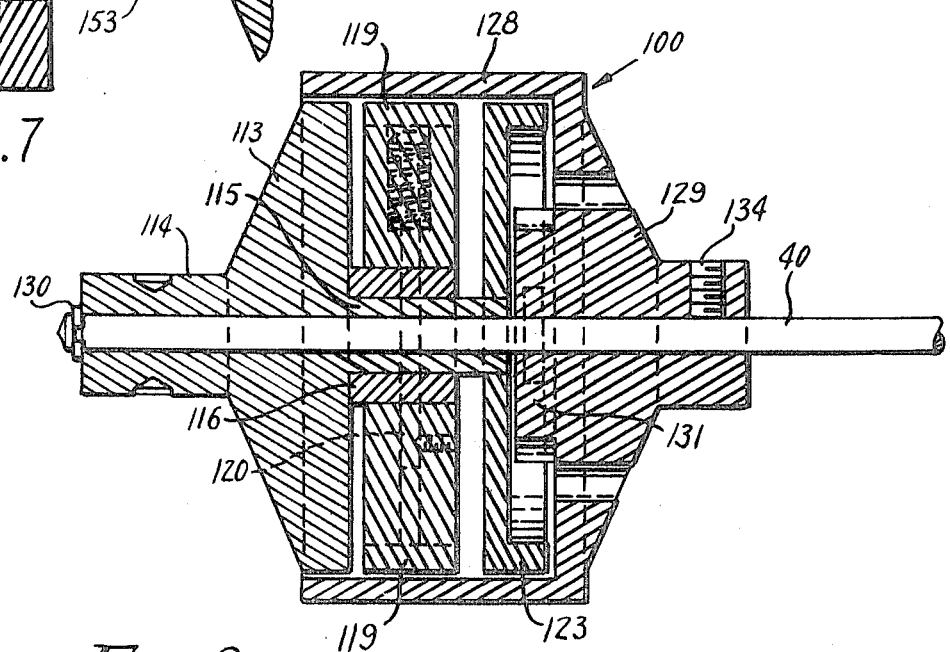
FIG. 6 is a vertical sectional view taken through a modified form of the invention.

In FIG. 6 a modified form of the invention is illustrated wherein a driven shaft 40 supports the centrifugal clutch indicated generally at 100. The centrifugal clutch 100 includes a face plate 113 having a hub 114 formed thereon journalled on the driven shaft 40 and secured thereon by a spring washer 130. The face plate 113 has a hollow shaft 115 integrally formed thereon and extending axially outwardly therefrom. A spacer 116 identical to the spacer 16 is mounted on the hollow shaft 115 and has a pair of oppositely disposed weights 119 spring mounted thereon on bolts 120. A pawl plate 123 identical to the pawl plate 23 is secured to the spacer 116 in the same manner as the pawl plate 23 is secured to the spacer 16.

A generally cylindrical clutch drum 128 encompasses the face plate 113 and pawl plate 123 and has a hub 129 integrally formed thereon and secured to the shaft 40 by a set-screw 134. The hub 129 has a cylindrical extension 131 which cooperates with pawls (not shown) on the pawl plate 123 in the same manner as illustrated in the form of the invention shown in FIGS. 1 through 5.

The structure of the centrifugal clutch illustrated in FIG. 6 and the pawl connection is essentially the same as that illustrated in the form of the invention shown in FIGS. 1 through 5 and its operation is identical thereto.

Figure 7:
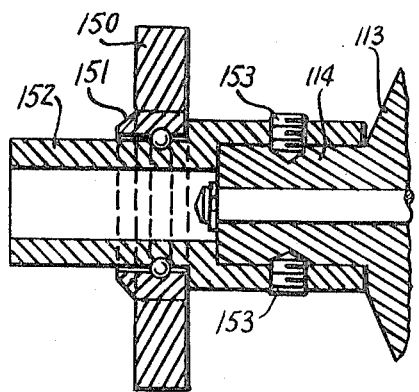
FIG. 7 is a fragmentary vertical sectional view taken through another modified form of the invention with parts broken away for convenience of illustration.

In the modification illustrated in FIG. 7 an outboard support is provided for the centrifugal clutch 100 and includes a wall 150 which supports a roller bearing 151 throughwhich a hollow coupling 152 extends. The hollow coupling 152 is attached to the hub 114 by set-screws 153.

The attachment illustrated in FIG. 7 may be used with the modification illustrated in FIG. 1 or the modification illustrated in FIG. 5 when desired.

Having thus described the preferred embodiments of the invention it should be understood that numerous structural modifications and adaptations may be resorted to without departing from the spirit of the invention.

What is claimed is:

1. A centrifugal clutch assembly comprising a face plate adapted to be secured to an engine, a spacer block secured to said face plate and extending outwardly therefrom, a shaft integrally formed on said face plate and extending axially therefrom through said spacer block, a pair of oppositely disposed weights, means mounting aid weights for radial outward movement from said spacer block and for limited rotary movement with respect to said spacer block, means resiliently urging said weights inwardly toward said spacer block, a clutch drum encompassing said face plate and said weights, for engagement by said weights upon radial outward movement of said weights, a hub integrally formed on said drum, a pawl plate secured to said spacer block, pawl means on said pawl plate for engagement with ratchet recesses formed in said hub, and means on said hub for connecting said hub to a driven shaft, said spacer block and said weights being adapted to turn relative to each other upon maximum torque loading of said assembly at high R.P.M.s whereby said spacer block forces said weights into locked engagement with said clutch drum.

2. A device as claimed in claim 1 wherein said face plate is detachably secured to the flywheel of an engine.

3. A device as claimed in claim 1 wherein the means spring urging said weights radially inwardly is adjustable in tension.

4. A device as claimed in claim 3 wherein said adjustable tension means includes a pair of oppositely disposed oppositely extending bolts slidably mounted in one of said weights and threaded into the other of said weights.

* * * * *